US009877601B2

(12) United States Patent
Bacallao et al.

(10) Patent No.: US 9,877,601 B2
(45) Date of Patent: Jan. 30, 2018

(54) PORTABLE COMPUTING DEVICE HOLDER

(71) Applicant: Wal-Mart Stores, Inc., Bentonville, AR (US)

(72) Inventors: Yurgis Mauro Bacallao, Centerton, AR (US); Stephen Tyler Caution, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 15/444,739

(22) Filed: Feb. 28, 2017

(65) Prior Publication Data

US 2017/0251837 A1 Sep. 7, 2017

Related U.S. Application Data

(60) Provisional application No. 62/302,263, filed on Mar. 2, 2016.

(51) Int. Cl.

| | |
|---|---|
| ***G06K 7/10*** | (2006.01) |
| ***A47F 9/04*** | (2006.01) |
| ***A47B 55/00*** | (2006.01) |
| ***G07G 1/00*** | (2006.01) |

(52) U.S. Cl.

CPC .............. *A47F 9/046* (2013.01); *A47B 55/00* (2013.01); *G07G 1/0081* (2013.01); *A47F 2009/041* (2013.01)

(58) Field of Classification Search

CPC ............ G06K 7/10; A47B 9/046; A47B 55/00
USPC .............................. 235/472.01, 462.45, 383
See application file for complete search history.

(56) References Cited

U.S. PATENT DOCUMENTS

| | | | |
|---|---|---|---|
| 7,681,344 B2 | 3/2010 | Crum | |
| 2004/0111320 A1 | 6/2004 | Schlieffers et al. | |
| 2005/0189423 A1* | 9/2005 | Kurobe | G06K 7/10881 235/462.45 |

(Continued)

FOREIGN PATENT DOCUMENTS

| | | |
|---|---|---|
| CN | 204231490 U | 3/2015 |

OTHER PUBLICATIONS

"Free HK 2014 New Soft Pipe Adjustable Lazy Bracket Metal Stand Holder Desk Bed Clamp Mount for 5-10.6" Tablet PC Mobile Phone GPS," Shenzhen Smilin Electronic Technology Co., Ltd., AliExpress.com, first accessed on Jan. 5, 2016; 3 pages.

(Continued)

*Primary Examiner* — Daniel Hess
(74) *Attorney, Agent, or Firm* — Schmeiser, Olsen & Watts LLP

(57) ABSTRACT

Described is a device for holding portable computing devices at a register of a retail store. The device for holding portable computing devices includes an elongate member with a first end and a second end. The first end has a coupler that couples to a pole. The second end is coupled to a register. In some embodiments, the elongate member includes a rod portion and a flat bar portion. The coupler couples the rod portion to the pole. The flat bar portion is coupled to the register. The rod portion is sized to conveniently receive portable computing device couplers so that the portable computing devices can be repeatably and removeably hung from the rod portion. Customers who have used the store's scanners while shopping can hang their borrowed scanner on the device when they are done using the scanner.

19 Claims, 8 Drawing Sheets

(56) References Cited

U.S. PATENT DOCUMENTS

2016/0313114 A1* 10/2016 Tohme ................. G01B 11/005

OTHER PUBLICATIONS

"Ideas needed on hanging PA speakers from ceiling for Dolby Atmos," AVSForum.com, first accessed on Jan. 5, 2016; 4 pages.
Zimmerman, Ann "Check Out the Future of Shopping: Saving Time Off the Weekly Grocery Run to Keep Consumers in Stores and Spending," The Wall Street Journal, May 18, 2011, wsj.com; 7 pages.
"Scan as you Shop," Tesco.com, first accessed on Jan. 5, 2017; 4 pages.
"Shipping Cart Phone Mount and Shopping Apps," Blog. ProClipUSA.com, Mar. 25, 2015; 10 pages.

* cited by examiner

PORTABLE COMPUTING DEVICE HOLDER

CROSS REFERENCE TO RELATED APPLICATION

This invention claims priority to U.S. provisional patent application Ser. No. 62/302,263, filed Mar. 2, 2016 to Applicant Wal-Mart Stores Inc., and entitled "Portable Computing Device Holder".

BACKGROUND OF THE INVENTION

Technical Field

This invention relates to holders for portable computing devices, and more specifically to a device that couples to a register in a retail store and is used to store portable computing devices such as scanners.

State of the Art

Portable computing devices are useful tools for customers of retail stores. Portable computing devices, which include portable scanners, mobile computing devices, smart phones, computing tablets and portable computers, can be used by consumers to obtain product information, track purchases, or pay for their purchases, for example. Often, consumers bring their own portable computing device into a retail store for use while shopping. But in some cases, portable computing devices are distributed by the retail store for customers to use while in the store. Portable computing devices that are loaned to customers for use in the store are collected from the customers before they leave the store, often at the checkout register. It is desirable to have a convenient place to store the collected the portable computing devices.

Accordingly, what is needed is a device for storing portable computing devices from customers. The device should safely and securely hold the portable computing devices until they are collected and stored or distributed to another customer.

DETAILED DESCRIPTION OF EMBODIMENTS OF THE INVENTION

Figure 1:
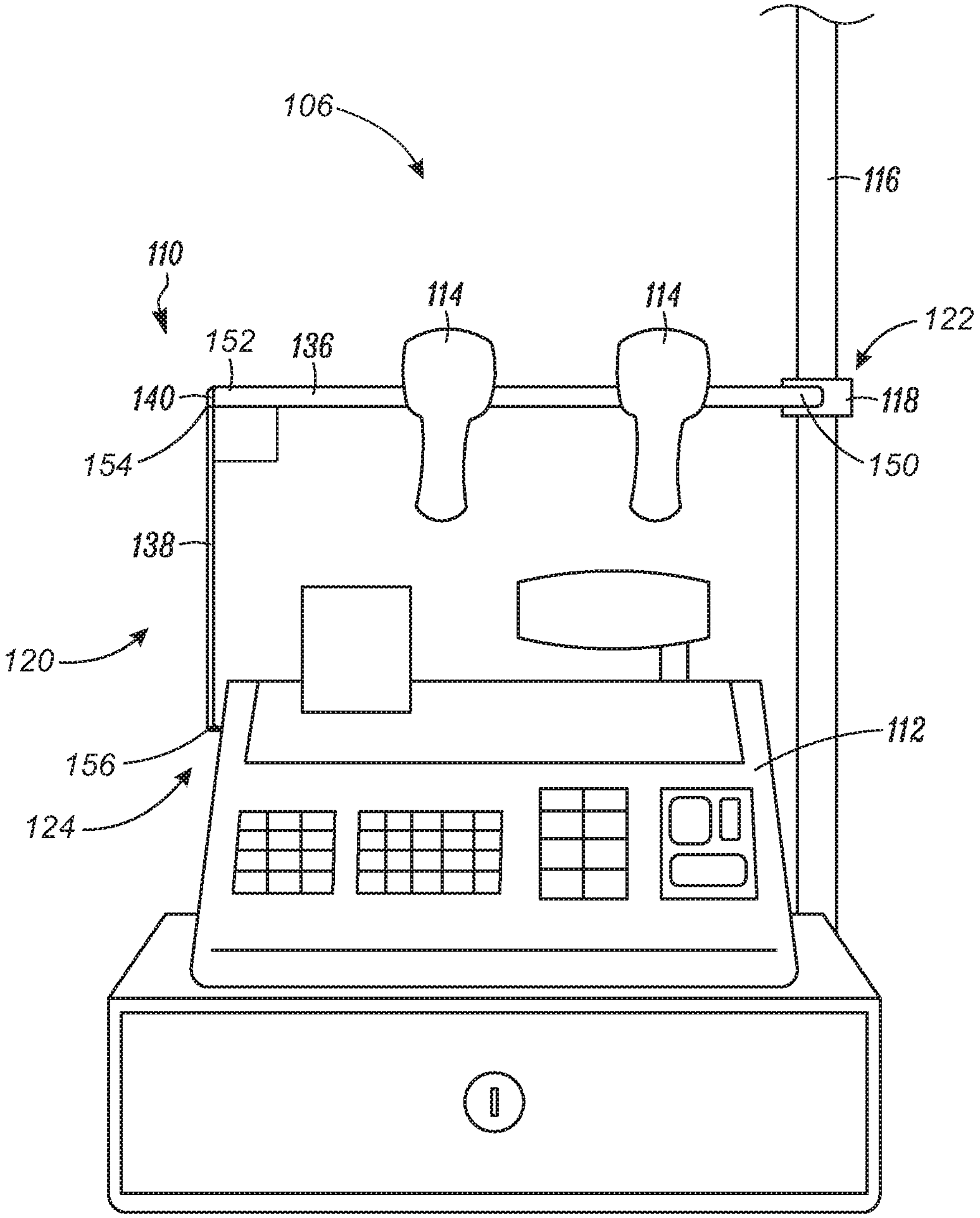
FIG. 1 shows a front view of an embodiment of a checkout station with a device for storing portable computing devices.

As discussed above, embodiments of the present invention relate to holders for portable computing devices, and more specifically to a device that couples to a register in a retail store and holds portable computing devices being returned by customers of the retail store. Disclosed is a checkout station with a device for storing portable devices, and a device for holding portable computing devices at a register. The portable computing devices can be any type of portable computing devices such as, but not limited to, portable scanners, smart phones, computing tablets or pads, portable computers, global positioning system devices, portable digital assistants, or any other type of portable computing device or other portable device. The checkout station with a device for holding portable devices includes a checkout register, a pole, and a device for storing portable devices. The device for storing portable devices includes an elongate member with a first end and a second end. The first end has a coupler that couples the first end of the elongate member to the pole. The second end of the elongate member is coupled to the register. The elongate member is configured such that one or more portable computing devices can be hung on, or otherwise removeably coupled to, the elongate member. In some embodiments, the elongate member includes a rod portion and a flat bar portion. The coupler is coupled to the rod portion. The rod portion is coupled to the flat bar portion at a junction. The flat bar portion is coupled to the register. The rod portion is sized to conveniently receive portable computing device couplers so that the portable computing devices can be repeatably and removeably hung from the rod portion. Customers who have used the store's portable computing devices while shopping can easily and conveniently hang the portable computing device on the device for holding portable computing devices when they are done using them. A store employee can pick up the used portable computing devices from the device for holding portable computing devices.

Portable computing devices are useful tools for customers of retail stores. Portable computing devices can be used by customers to obtain product information, to track purchases, to store shopping lists, to map out a shopping trip based on products needed or favorite departments, for example, or to pay for purchases. Often customers bring their own portable computing device into a retail store for use while shopping. But in some cases, portable computing devices are distributed by the retail store for customers to use while in the store. For example, portable scanners are loaned to customers in some stores so that customers can scan their purchases while they shop. In stores that loan portable computing devices to customers, these portable computing devices can be picked up when the customer enters the store, and collected before the customer leaves the store. The disclosed device for holding portable computing devices is located at checkout registers, where customers can hang the portable computing device once they are done with it and before they leave the store. The device for holding portable computing devices will hold a number of portable computing devices until they are collected to be stored or distributed to other customers.

Disclosed is a checkout station with a device for storing portable scanners and portable devices. The disclosed device for storage of portable scanners and portable computing devices, such as scanners or smart phones, includes a means for hanging a portable computing device, and a means for attaching the means for hanging the portable computing device to a register. In some embodiments, the device includes a means for attaching the means for hanging the portable computing device to a pole. In some embodiments, the portable computing device is a portable scanner. In some embodiments, the portable computing device is a smart phone. In some embodiments, the portable computing device is a tablet computer.

FIG. 1 shows a simplified front view of a checkout station 106 with a device for storing portable scanners 110. Device for holding portable scanners 110 can also be referred to as a device for holding portable computing devices, a portable scanner storage device, or a portable device holder, for example. Device for storing portable scanners 110 is a device that can be used to store many different types of portable devices and portable computing devices, for example, but not by way of limitation, portable scanners, smart phones, computing tablets, or portable computers.

Checkout station 106 often resides in a retail store or other establishment that sells merchandise. Checkout station 106 includes a register 112, a pole 116, and device for storing portable scanners 110, as shown in FIG. 1. Checkout station 106 can be an employee-run checkout station or a self-checkout station. Register 112 is a checkout register that tabulates purchased items and adds up the total amount of money due from the customer. Pole 116 is a structural device located near register 112 that helps anchor device for storing portable scanners 110. Pole 116 can take many different embodiments of structural elements. Device for storing portable scanners 110 holds at least one portable scanner 114. In this embodiment, device for storing or holding portable scanners 110 is holding two portable scanners 114. Portable scanners 114, in this embodiment, are loaned to customers to use while they shop. When the customer is ready to leave the store, they hang their portable scanner 114 onto device for holding portable scanners 110 before leaving the store. Device for holding portable scanners 110 holds one or more portable scanners 114 or other portable devices until they are collected or borrowed by another customer.

Figure 2:
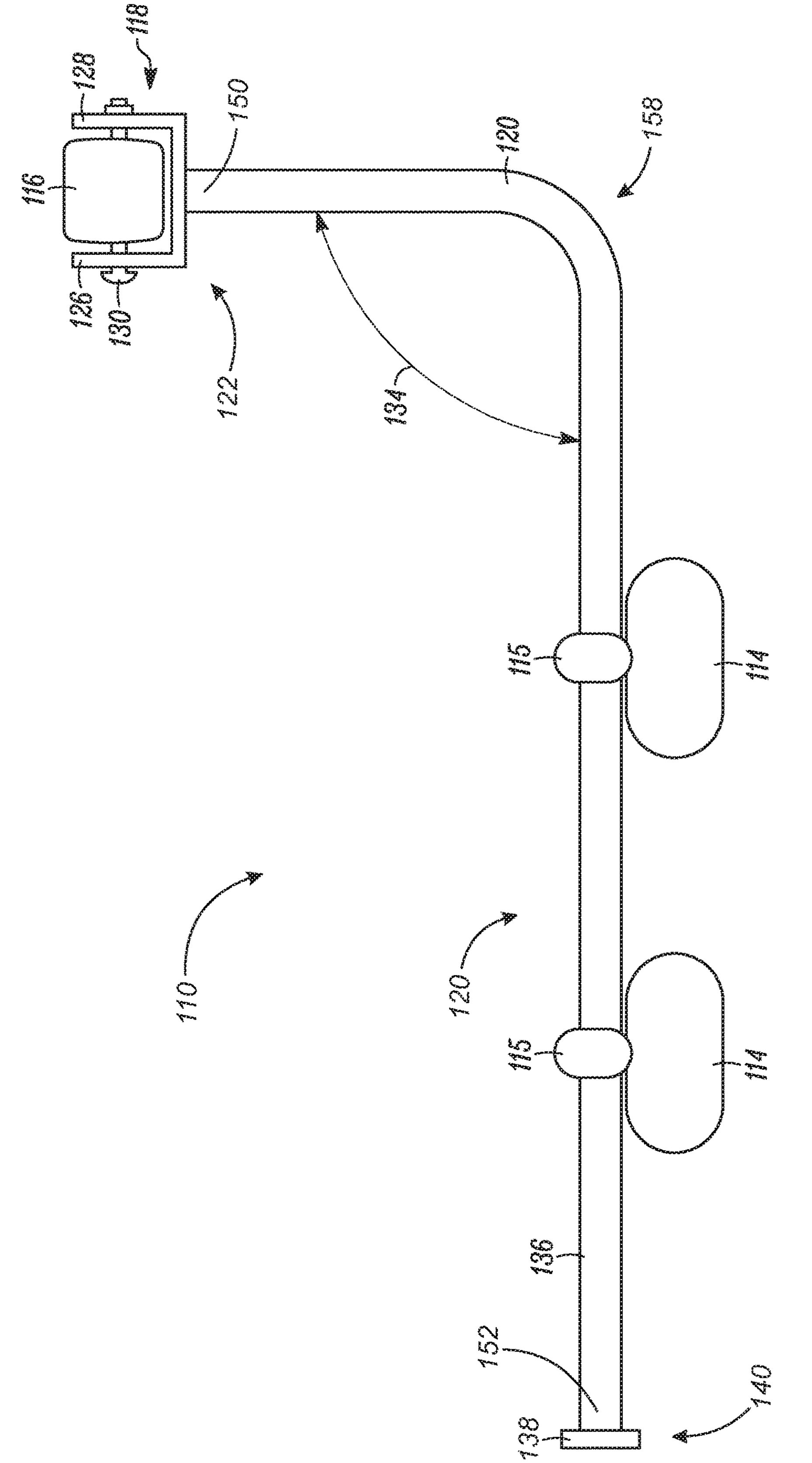
FIG. 2 shows a simplified top view of an embodiment of a device for holding portable computing devices at a register.
Figure 3:
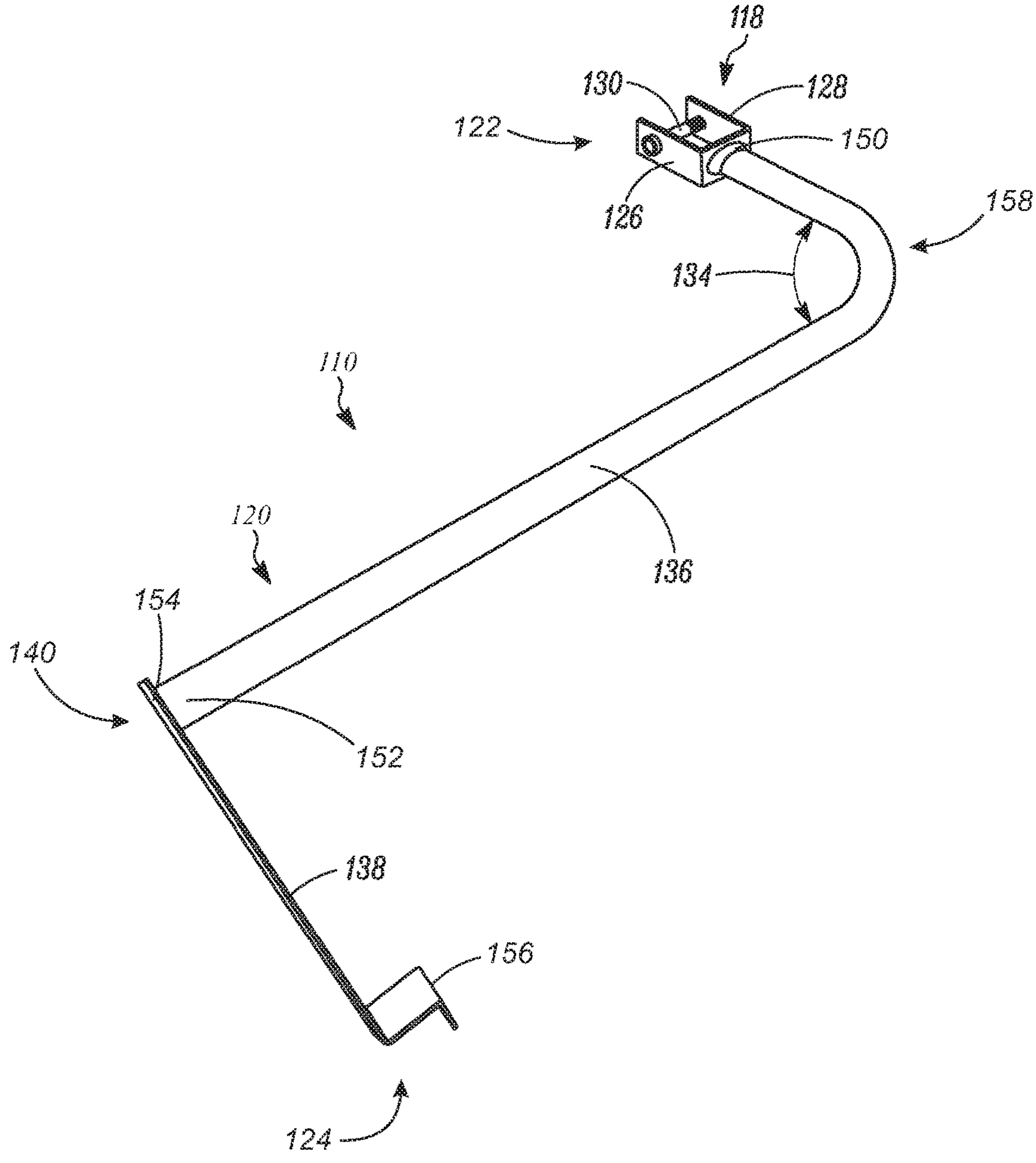
FIG. 3 shows a top perspective view of the device for holding portable computing devices of FIG. 2.
Figure 4:
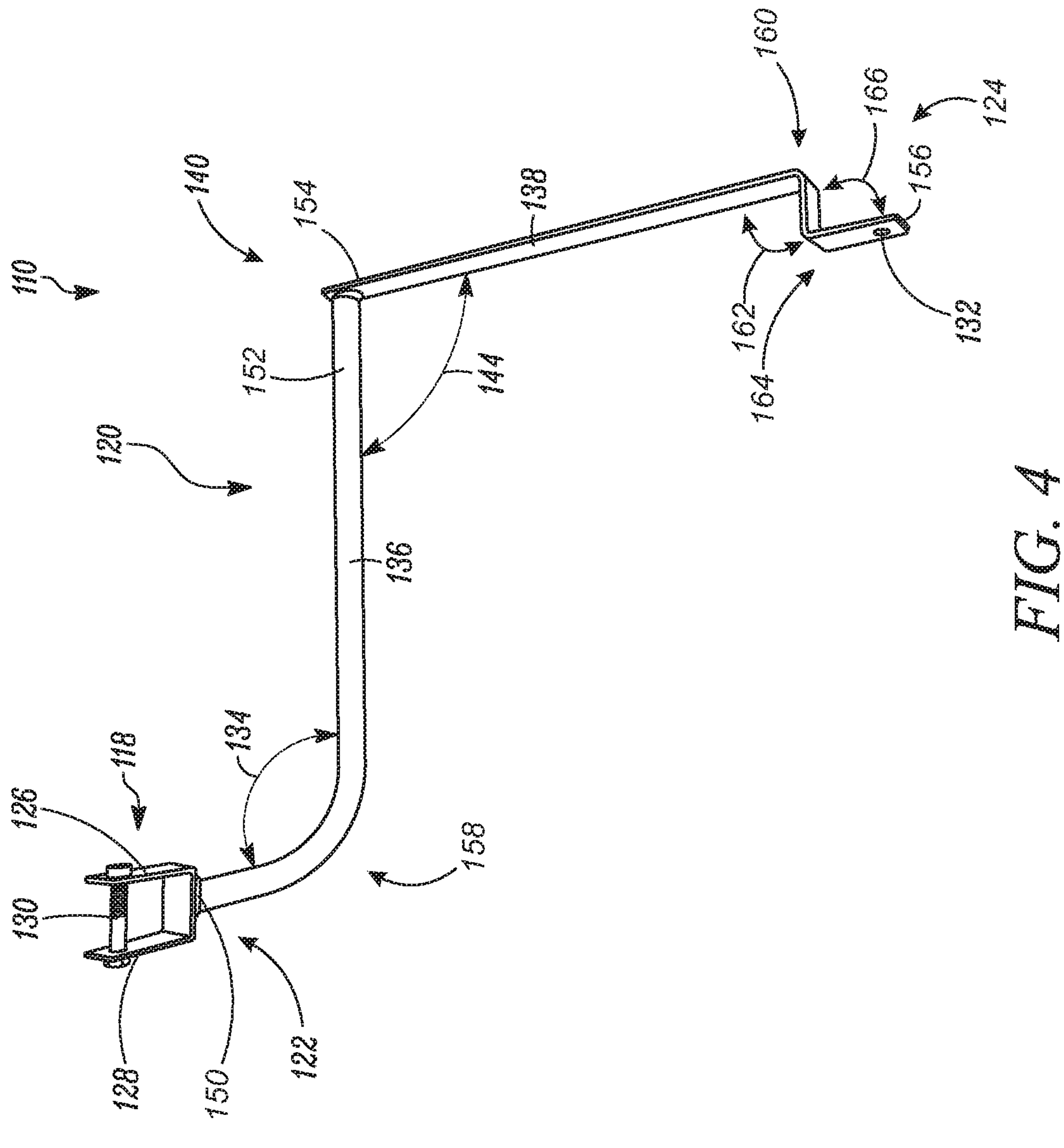
FIG. 4 shows a bottom perspective view of the device for holding portable computing devices of FIG. 2.
Figure 5:
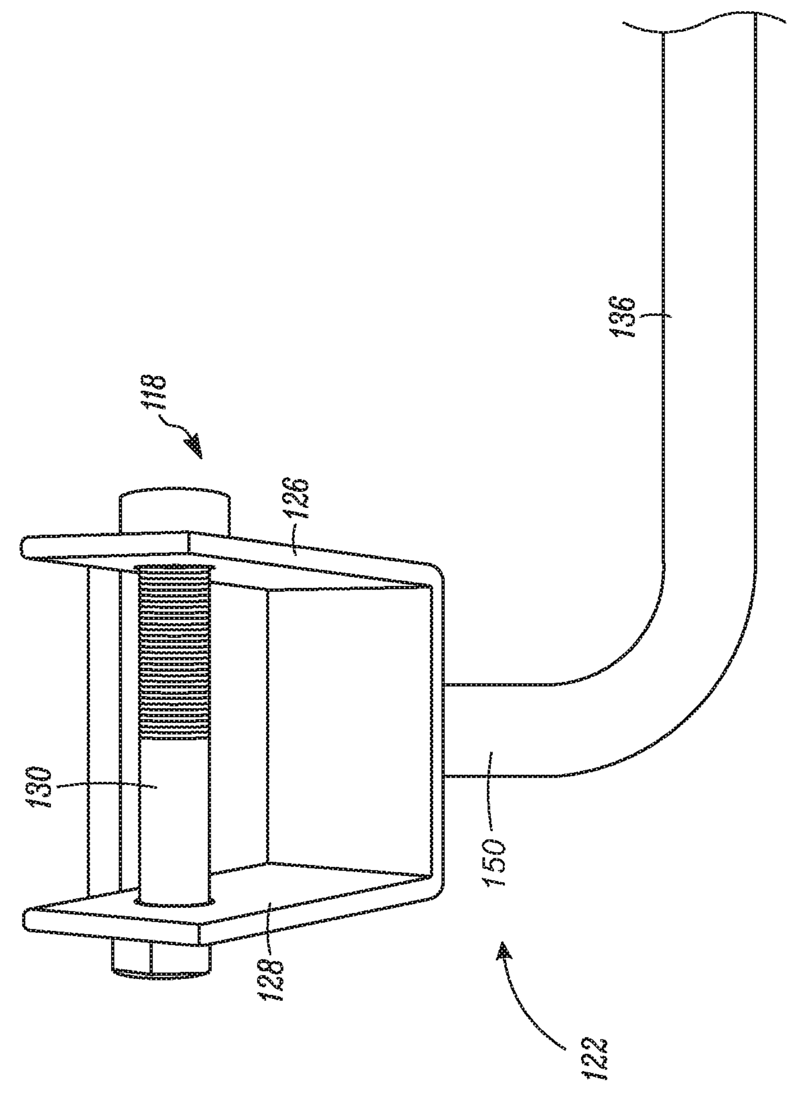
FIG. 5 shows a first end of the device for holding portable computing devices of FIG. 2.
Figure 6:
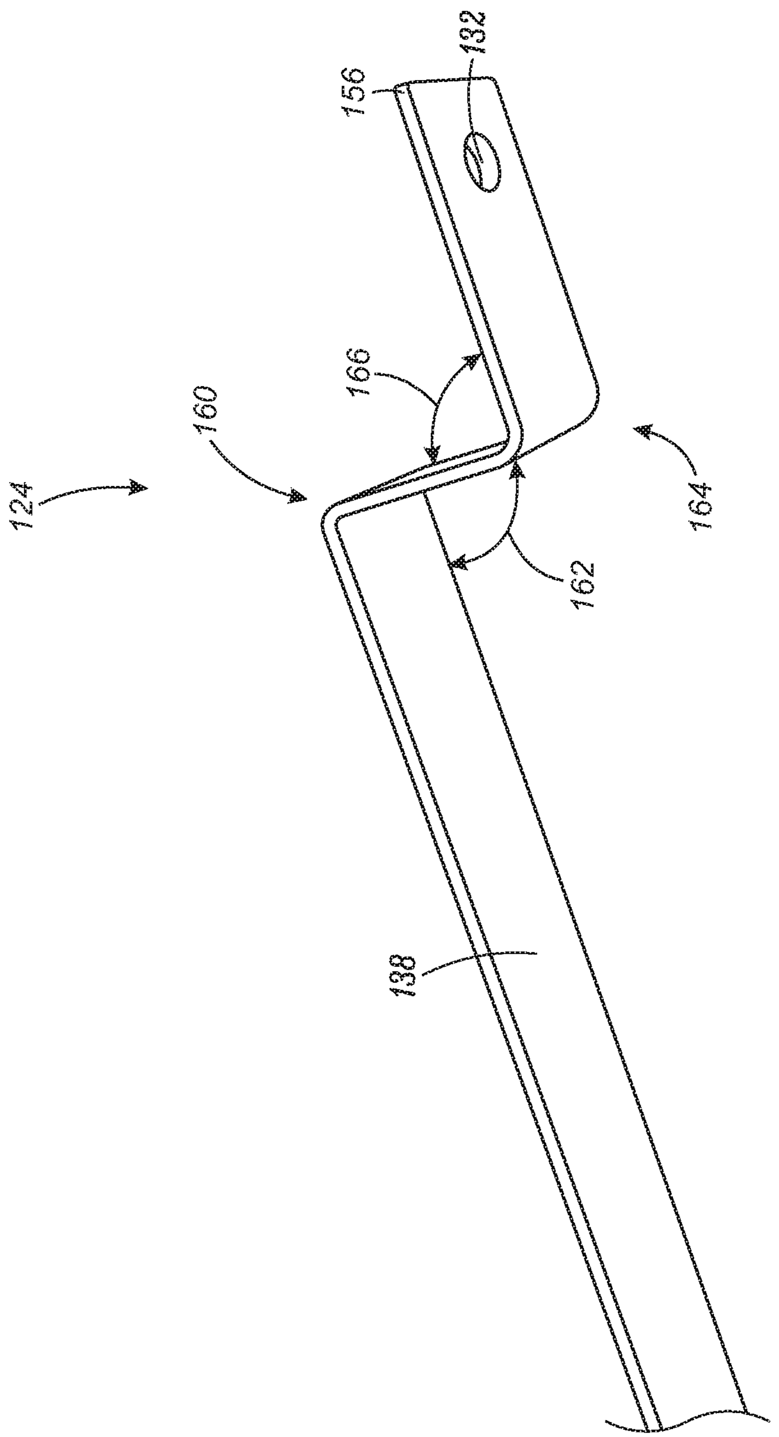
FIG. 6 shows a second end of the device for holding portable computing devices of FIG. 2.

FIG. 2 through FIG. 6 show details of device for holding portable scanners 110. FIG. 2 shows a top view of device 110 of FIG. 1, with register 112 not shown for clarity. FIG. 3 shows a top perspective view of device 110. FIG. 4 shows a bottom perspective view of device 110. FIG. 5 shows a close-up view of a first end 122 and coupler 118 of device 110. FIG. 6 shows a close-up view of a second end 124 of device 110.

Device 110 includes an elongate member 120. Elongate member 120 is an elongate piece of rigid material with a length longer than its width, such as a bar or rod. Elongate member 120 is configured to couple to register 112 and hold at least one portable device. Elongate member 120 holds at least one portable scanner 114 or other portable device in this embodiment. Elongate member 120 has a first end 122 and a second end 124 opposing first end 122. First end 122 is coupled to pole 116, and second end 124 is coupled to register 112. In this embodiment, first end 122 is coupled to pole 116 using a coupler 118. Elongate member 120 extends between pole 116 and register 112 and is held at each end by pole 116 and register 112. Portable scanners 114 are hung from elongate member 120, as shown in FIG. 1 and FIG. 2. When customers are done using portable scanners 114 loaned to them by the retail store, they can conveniently hang portable scanners 114 from device 110 at register 112. In this embodiment, portable scanners 114 are coupled to elongate member 120 by hanging portable scanners 114 from elongate member 114, but this is not meant to be limiting. In some embodiments, portable scanners 114 are coupled in other ways to elongate member 120.

Elongate member 120 in this embodiment includes a rod portion 136 and a flat bar portion 138. Rod portion 136 extends from first end 122 to a junction 140. Flat bar portion 138 extends from junction 140 to second end 124. Rod portion 136 and flat bar portion 138 are coupled together at junction 140. Rod portion 136 is the part of elongate member 120 that portable scanners 114 hang from. In some embodiments, rod portion 136 is hollow. In this embodiment, rod portion 136 is the means for hanging a portable computing device 114, but this is not meant to be limiting. The means for hanging a portable computing device 114 can take many different forms. In this embodiment, flat bar portion 138 is the means for attaching the means for hanging portable scanner 114 to register 112. This is not meant to be limiting, however, because the means for attaching the means for hanging portable scanner 114 to a register can take many different forms. In this embodiment, coupler 118 is the means for attaching the means for hanging portable scanner 114 to pole 116. Coupler 118 can take many different forms and is not limited to the examples disclosed herein.

FIG. 2 shows a top view of device 110 of FIG. 1, with register 112 not shown for simplicity and clarity of the figure. FIG. 2 shows rod portion 136 extending from first end 122 to junction 140. Coupler 118 is attached to first end 122 and couples rod portion 136 to pole 116. Two portable computing devices 114, which in this embodiment are portable scanners, are hanging from rod portion 136 using portable device couplers 115. In this embodiment, portable device couplers 115 are hangars that hang portable scanners 114 on rod portion 136. Rod portion 136 is sized and shaped such that couplers 115 easily hang portable scanners 114 on rod 136. Device for holding portable scanners 110 and rod portion 136 are positioned by register 112 so that customers can easily hang their borrowed portable scanner 114 onto rod portion 136 on their way out of the retail store. Elongate member 120 first end 122 is coupled to pole 116 to give stability to device 110 and provide a mounting structure for first end 122. Elongate member 120 second end 124 is coupled to register 112 to provide mounting and stability to second end 124 (FIG. 1). With first end 118 coupled to pole 116 and second end 124 coupled to register 112, device 110 holds portable scanners 114 near register 112, providing a convenient storage and holding apparatus for portable computing devices 114.

In the embodiment shown in FIG. 1 through FIG. 6, first end 122 is coupled to pole 116 using a coupler 118, which in this embodiment is a clevis, as shown in FIG. 2, FIG. 3, FIG. 4, and FIG. 5. Coupler 118 is coupled to first end 122 of rod portion 136. Coupler 118 includes a first clevis arm 126 and a second clevis arm 128. Pole 116 is positioned between first and second clevis arm 126 and 128. Clevis pin 130 extends through holes in first clevis arm 126, in pole 116, and in second clevis arm 128 to couple coupler 118 to pole 116. It is to be understood that coupler 118 can be many different types of couplers that couple first end 122 to pole 118.

Rod portion 136 is an elongate rod of rigid or semi-rigid material with a circular cross-section. The circular cross section helps to easily remove and hang portable devices such as portable scanners 114 to rod portion 136. In some embodiments, rod portion 136 is hollow. Rod portion 136 has a rod portion first end 150 and a rod portion second end 152 opposing rod portion first end 150. Rod portion first end 150 is coupled to pole 116 using coupler 118. Rod portion 136 has a rod bend 158 with a rod bend angle 134. Rod portion 136 is bent to create rod bend 158. Rod bend 158 is between rod portion first end 150 and rod portion second end 152. Rod bend 158 is used to route rod portion 136 by register 112, then to pole 116. Pole 116 supports elongate member 120 and rod portion 136. Rod bend angle 134 in this embodiment is about 90 degrees, but this is not meant to be limiting. A rod bend angle 134 of approximately 90 degrees provides for a rod portion 136 that runs along the backside of register 112, making it convenient to hang portable scanners 114 from rod portion 136, while routing rod 136 to pole 116 for secure mounting of first end 122 to pole 116. In some embodiments, rod bend angle 134 is between about 80 and about 100 degrees. A rod bend angle 134 of between about 80 and about 100 degrees is used to keep rod portion 136 sturdy and without sharp angles that could catch on clothes or people. A rod bend angle 134 of greater than 45 degrees is used in some embodiments to route rod portion 136 around structural elements and to accommodate the physical structure of checkout station 106.

Flat bar portion 138 is an elongate bar of rigid material with a rectangular cross section, as shown in FIG. 1, FIG. 3, and FIG. 4. The rectangular cross section provides strength to elongate member 120 and makes it easier to configure flat bar portion 138 to couple to different sizes and shapes of registers. Flat bar portion 138 has a flat bar portion first end 154 and a flat bar portion second end 156 opposed to flat bar portion first end 154. Flat bar portion first end 154 is coupled to rod portion second end 152 at junction 140. Flat bar portion second end 156 is coupled to register 112. Flat bar portion 138 in this embodiment has a first flat bar bend 160 and a second flat bar bend 164, as shown in FIG. 4 and FIG. 6. First flat bar bend 160 and second flat bar bend 162 are used to help securely couple flat bar portion 138 to register 112, then route flat bar portion 138 away from register 112. First flat bar bend 160 and second flat bar bend 162 are both right angle bends in this embodiment to provide stability and strength to flat bar portion 138, but this is not meant to be limiting.

FIG. 3 and FIG. 4 show perspective views of device 110, including rod portion 136, flat bar portion 138, and coupler 118. Flat bar portion 138 and rod portion 136 meet at junction 140. Junction 140 is where rod portion 136 and flat bar portion 138 are coupled together. In this embodiment, rod portion 136 and flat bar portion 138 are welded, but this is not meant to be limiting. In this embodiment, rod portion 136 and flat bar portion 138 form an approximately 90 degree junction angle 144 at junction 140, as can be seen best in FIG. 4. A junction angle 144 of approximately 90 degrees provides for easy and sturdy coupling of flat bar portion 138 and rod portion 136, as well as routing of elongate member 120 from pole 116 to register 112. Rod portion 136 and flat bar portion 138 are perpendicular to each other in this embodiment, but this is not meant to be limiting. In some embodiments, junction angle 144 is between about 85 degrees and about 95 degrees. In some embodiments, junction angle 144 is greater than 45 degrees. A junction angle of greater than 45 degrees helps keep elongate member 120 from having sharp bends and edges that can catch clothing, for example.

It is to be understood that elongate member 120, including rod portion 136 and flat bar portion 138, can have other shapes and values for angles 134 and 144 to fit other placements and configurations of register 112 and pole 116.

FIG. 5 shows a close-up view of first end 122 with rod portion first end 150 and coupler 118. Coupler 118 is coupled to first end 122 in order to couple first end 122 and rod portion first end 150 to pole 116 (FIG. 1 and FIG. 2). In this embodiment, coupler 118 is a clevis, and includes first and second clevis arms 126 and 128, and clevis pin 130. It is to be understood that coupler 118 can take many different forms for coupling first end 122 to pole 116. Coupler 118 couples rod portion first end 150 to pole 116. Coupler 118 couples rod portion first end 150 at elongate member first end 122 to pole 118 by securing pole 116 between first clevis arm 126 and second clevis arm 128 using clevis pin 130, as shown in FIG. 2. In this embodiment, clevis pin 130 extends through pole 116, but this is not meant to be limiting. First and second clevis arm 126 and 128 extend along either side of pole 116, with clevis pin 130 securing coupler 118 to pole 116.

FIG. 6 shows a close-up view of second end 124, including flat bar second end 156. Flat bar second end 156 is coupled to register 112 (FIG. 1). In this embodiment, flat bar second end 156 has a hole 132 that is used to couple second end 124 and flat bar second end 156 to register 112. A screw or a bolt or a pin can be used with hole 132 to couple flat bar second end 156 to register 112. It is to be understood that many different types of couplers can be used to couple flat bar second end 156 to register 112. FIG. 6 also shows flat bar first bend 160 and flat bar second bend 164. Flat bar first bend 160 has a flat bar first bend angle 162, which in this embodiment is about 90 degrees. Flat bar second bend 164 has a flat bar second bend angle 166, which in this embodiment is about 90 degrees. In some embodiments, flat bar first bend angle 162 and flat bar second bend angle 166 have values between 45 and 135 degrees, to accommodate specific physical characteristics of checkout station 106.

Forming elongate member 120 using flat bar portion 138 and rod portion 136 provides many advantages over the use of an elongate member comprised solely of a flat bar or a rod, some of which are described herein. Flat bar portion 138 easily couples to register 112. Rod portion 136 is easily coupled to coupler 118 or any coupler for coupling rod portion 136 to pole 116. Flat bar portion 138 easily couples to rod portion 136 at junction 140 with a junction angle 144 of approximately 90 degrees. Junction 140 takes up less space than a bend angle of 90 degrees in rod portion 136, and is stronger than a 90 degree bend in either rod portion 136 or flat bar portion 138. The combination of rod portion 136 and flat bar portion 138 provide an elongate member 120 that has the strength and rigidity to hold mobile scanners 114 alongside register 112, and yet is flexible in routing and easily couples to register 112 and pole 116.

Disclosed is a method of forming a holder for portable scanners that includes an act of forming an elongate member, wherein a first end of the elongate member is configured to couple to a pole, and wherein a second end of the elongate member is configured to couple to a register. Forming an elongate member can include many other acts. In some embodiments, forming an elongate member includes coupling a rod to a flat bar at a junction. In some embodiments, the rod and the flat bar form an approximately 90 degree angle at the junction. In some embodiments, forming an elongate member includes putting an approximately 90 degree bend in the rod. In some embodiments, forming an elongate member includes coupling a clevis to the first end.

Figure 7:
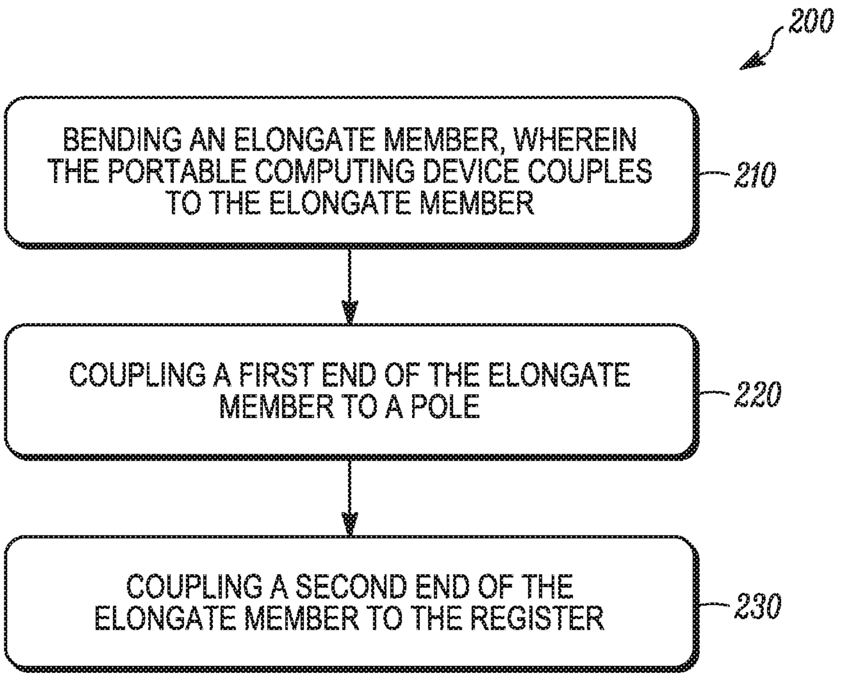
FIG. 7 illustrates a method of storing a portable computing device at a register.

FIG. 7 illustrates a method 200 of storing a portable computing device at a register. Method 200 includes an act 210 of bending an elongate member, where the portable computing device couples to the elongate member. Method 200 also includes an act 220 of coupling a first end of the elongate member to a pole. Method 200 also includes an act 230 of coupling a second end of the elongate member to the register. Method 200 can include many other acts. In some embodiments, method 200 includes coupling a rod to a flat bar to create an elongate member. In some embodiments, method 200 includes coupling a clevis to the rod. In some embodiments, method 200 includes drilling a hole in the flat bar.

In some embodiments, act 210 of bending an elongate member includes putting an approximately 90 degree bend angle in the elongate member.

In some embodiments, act 220 of coupling a first end of the elongate member to a pole includes capturing the pole between a pair of arms of a clevis using a clevis pin.

In some embodiments, act 230 of coupling a second end of the elongate member to the register includes bolting the second end to a register using the hole in the flat bar.

Figure 8:
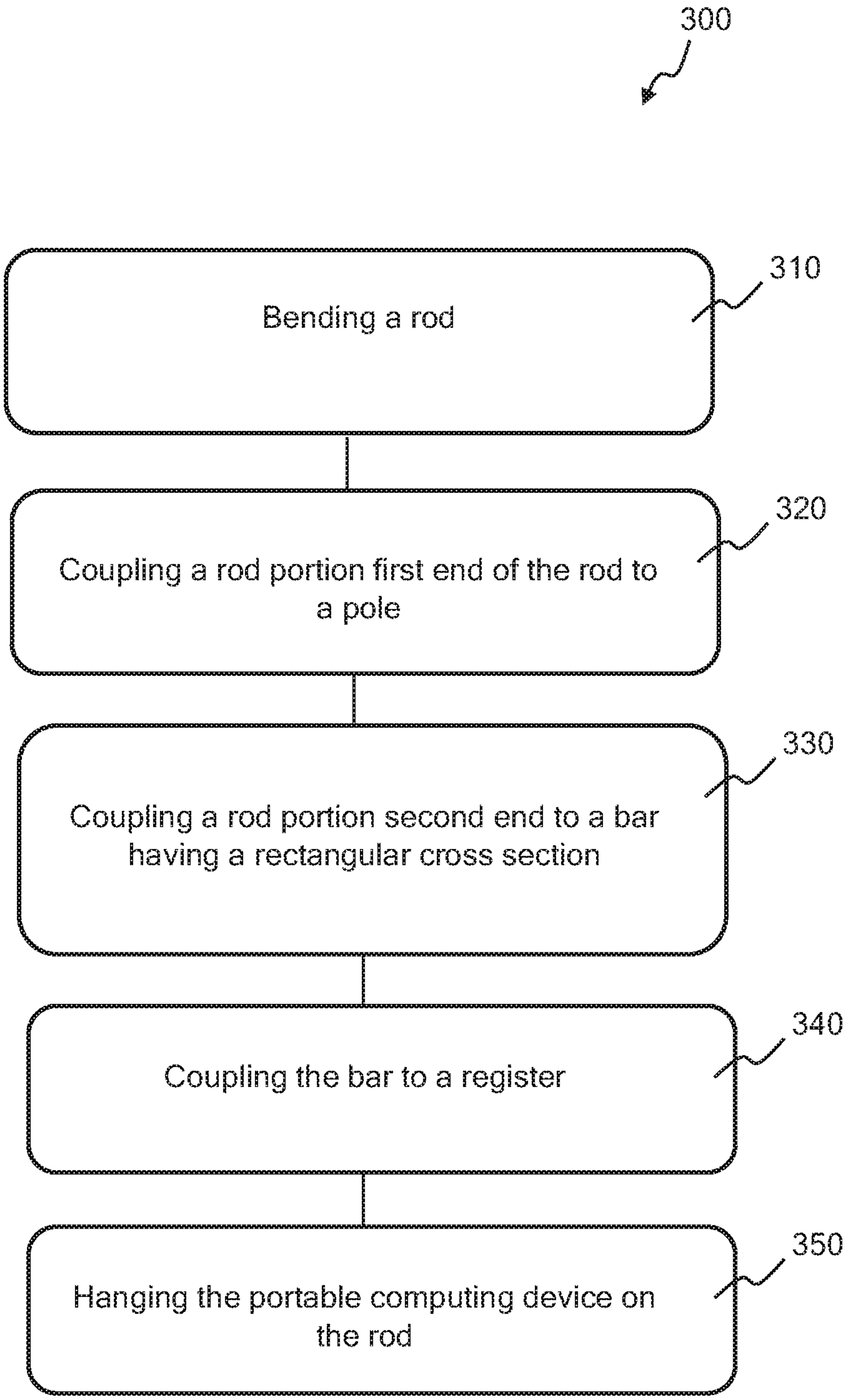
FIG. 8 illustrates a further method of storing a portable computing device at a register.

FIG. 8 illustrates a method 300 of storing a portable computing device at a register. Method 300 includes an act 310 of bending a rod, wherein the rod has a rod portion first end, a rod portion second end, and a circular cross section. The circular cross section makes it easy to couple and uncouple portable devices such as scanners and smart phones to the rod. The rod can be made hollow to save weight. The rod can be made of metal for easy bending to customize the rod to particular mechanical configurations. In some embodiments, bending the rod means putting a rod bend having a rod bend angle of about 90 degrees into the rod.

Method 300 also includes an act 320 of coupling the rod portion first end to a pole. The pole can be any structural element near the register that can be used to mount and stabilize the rod portion first end.

Method 300 also includes an act 330 of coupling the rod portion second end to a bar having a rectangular cross section, and an act 340 of coupling the bar to the register. The bar is an elongate member of rigid or semi-rigid material with a rectangular cross-section, such as a flat bar. Coupling the bar with a rectangular cross section to the rod makes the device for holding portable devices stronger and provides for flexibility in coupling the device to the register. In some embodiments, method 300 includes putting two right angle bends in the bar to facilitate coupling the bar to the register. In some embodiments, the rod is perpendicular to the bar.

Method 300 also includes an act 350 of hanging the portable computing device on the rod. The portable computing device can be a portable scanner, a smart phone, a portable computer, a table device, or other portable device.

Method 300 can include many other acts. In some embodiments, method 300 includes coupling a clevis to the rod portion first end. In this embodiment, coupling the rod portion first end to a pole includes securing the pole between a pair of arms of the clevis using a clevis pin.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A checkout station with a device for storing portable scanners, the checkout station comprising:

a checkout register;

a pole; and an elongate member comprising:

a rod portion with a rod portion first end coupled to the pole with a clevis and a rod portion second end opposing the rod portion first end; and a flat bar portion with a flat bar portion first end coupled to the rod portion second end and a flat bar portion second end coupled to the register;

wherein the elongate member holds at least one portable scanner.

2. The checkout station of claim 1, wherein the rod portion comprises a rod bend between the rod portion first end and the rod portion second end, wherein the rod bend has a rod bend angle of between about 80 degrees and about 100 degrees.

3. The checkout station of claim 1, wherein the rod portion second end is coupled to the flat bar portion first end at a junction having a junction angle between the rod portion and the flat bar portion, and wherein the junction angle is between about 85 degrees and about 95 degrees.

4. The checkout station of claim 1, wherein the rod portion is perpendicular to the flat bar portion.

5. A device for holding portable scanners at a register, the device comprising: a rod portion comprising:

a rod portion first end;

a rod portion second end opposing the rod portion first end;

and a rod bend in the rod portion, wherein the rod bend has a rod bend angle of greater than 45 degrees;

and a flat bar portion comprising: a flat bar portion first end coupled to the rod portion second end at a junction having a junction angle of greater than 45 degrees; and a flat bar portion second end coupled to the register;

and further comprising a coupler coupled to the rod portion first end, wherein the coupler is configured to couple the rod portion first end to a pole.

6. The device of claim 5, wherein the coupler comprises a clevis.

7. The device of claim 5, wherein the rod portion is an elongate rod of a rigid material with a circular cross section.

8. The device of claim 5, wherein the rod bend angle is between about 80 degrees and about 100 degrees.

9. The device of claim 5, wherein the rod bend angle is approximately 90 degrees.

10. The device of claim 5, wherein the flat bar portion is an elongate bar of a rigid material with a rectangular cross section.

11. The device of claim 5, wherein the junction angle is between about 80 degrees and about 100 degrees.

12. The device of claim 5, wherein the flat bar portion comprises a flat bar first bend and a flat bar second bend.

13. The device of claim 5, wherein a hole in the flat bar portion second end couples the flat bar portion second end to the register.

14. A method of storing a portable computing device at a register comprising:

bending a rod, wherein the rod has a rod portion first end, a rod portion second end, and a circular cross section;

coupling the rod portion first end to a pole;

coupling the rod portion second end to a bar having a rectangular cross section;

coupling the bar to the register; and hanging the portable computing device on the rod.

15. The method of claim 14, wherein the bending the rod comprises putting a rod bend having a rod bend angle of about 90 degrees into the rod.

16. The method of claim 14, wherein the rod is perpendicular to the bar.

17. The method of claim 14, further comprising coupling a clevis to the rod portion first end.

18. The method of claim 17, wherein the coupling the rod portion first end to a pole comprises securing the pole between a pair of arms of the clevis using a clevis pin.

19. The method of claim 14, further comprising putting two right angle bends in the bar.

* * * * *